P. JUNG.
Sad-Iron Holder.
No. 211,912. Patented Feb. 4, 1879.
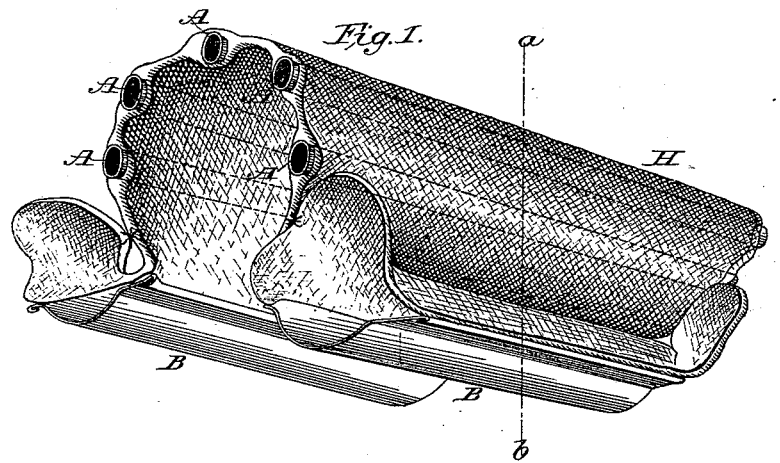
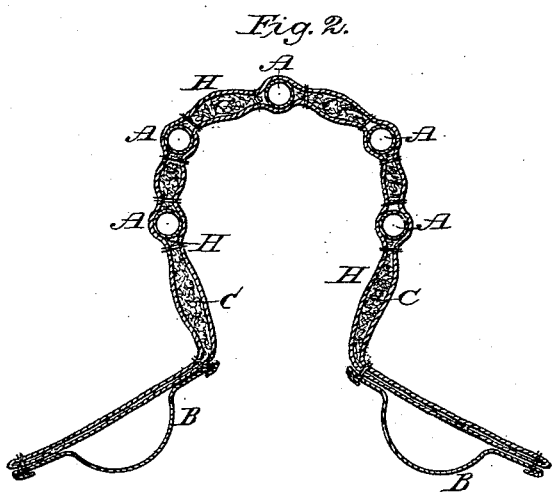
Witnesses:
Inventor:

UNITED STATES PATENT OFFICE.

PHILIPP JUNG, OF JERSEY CITY, NEW JERSEY.

IMPROVEMENT IN SAD-IRON HOLDERS.

Specification forming part of Letters Patent No. 211,912, dated February 4, 1879; application filed November 29, 1878.

*To all whom it may concern:*

Be it known that I, PHILIPP JUNG, of Jersey City, in the county of Hudson and State of New Jersey, have invented a Holder for Smoothing-Irons, of which the following is a specification:

In the drawings, Figure 1 is a perspective view of my device, and Fig. 2 is a cross-section, taken on the line $a\,b$ of Fig. 1.

Like letters refer to the same parts.

My invention consists of two pieces of strong canvas or other similar material, stitched together at such intervals as to provide pockets, in connection with metal tubes open at both ends, and layers of wool alternately arranged in said pockets, as will be hereinafter more fully described.

H H represent an outer and an inner layer of some strong and flexible material, such as canvas. These layers are stitched together at suitable intervals to form pockets, and these pockets are alternately filled by metal tubes with open ends and packings of wool.

The tubes lettered A, being open at their ends, allow a circulation of air throughout the portion of the holder grasped by the hand, and so prevent heat being communicated from the hot iron to the hand.

It is obvious that if the tubes are placed close together the device, besides being clumsy, will be too rigid for rapid use; hence each alternate pocket, instead of a tube, contains a packing, C, of wool, which does not prevent the bending of the device, and at the same time keeps the hot air from the iron from rising between the tubes to the hand.

The two ends of the canvas layers are bent tangentially from the central portion, and rigidly secured in that position by being fastened to sheet-metal plates arranged on the under side thereof, and bulged at their center, to allow a circulation of air between them and the canvas, as seen at B.

What I claim as new, and desire to secure by Letters Patent, is—

1. A sad-iron holder consisting of an outer and inner flexible material, and an interposed series of tubes, open at their ends, to promote a circulation of air, substantially as shown and described.

2. A sad-iron holder consisting of an outer and inner flexible material, and an interposed series of tubes, open at their ends, and the tubes arranged therein alternately with a packing of wool, substantially as shown and described.

PH. JUNG. [L. S.]

Witnesses:
PETER SEMLER,
S. J. CARLOCK.